(12) United States Patent
Bensmann et al.

(10) Patent No.: US 11,845,550 B2
(45) Date of Patent: Dec. 19, 2023

(54) WING LEADING-EDGE DEVICE AND A WING HAVING SUCH A WING LEADING-EDGE DEVICE

(71) Applicant: AIRBUS OPERATIONS GMBH, Hamburg (DE)

(72) Inventors: Stefan Bensmann, Hamburg (DE); Marcus Erban, Hamburg (DE); Martin Fees, Hamburg (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 180 days.

(21) Appl. No.: 17/433,944

(22) PCT Filed: Feb. 28, 2020

(86) PCT No.: PCT/EP2020/055279
§ 371 (c)(1),
(2) Date: Aug. 25, 2021

(87) PCT Pub. No.: WO2020/174084
PCT Pub. Date: Sep. 3, 2020

(65) Prior Publication Data
US 2022/0135206 A1   May 5, 2022

(30) Foreign Application Priority Data

Feb. 28, 2019 (DE) .............. 10 2019 105 108.8

(51) Int. Cl.
*B64C 9/22* (2006.01)
*B64C 9/08* (2006.01)
(Continued)

(52) U.S. Cl.
CPC ............... *B64C 9/22* (2013.01); *B64C 9/08* (2013.01); *B64C 3/185* (2013.01); *B64C 2009/143* (2013.01)

(58) Field of Classification Search
CPC .. B64C 9/22; B64C 9/08; B64C 3/185; B64C 2009/143
See application file for complete search history.

(56) References Cited

U.S. PATENT DOCUMENTS

| 6,149,105 A | 11/2000 | Jaggard |
| 2007/0034747 A1 | 2/2007 | Amorosi et al. |

(Continued)

FOREIGN PATENT DOCUMENTS

| EP | 0 188 823 | 7/1986 |
| EP | 2 214 959 B1 | 8/2010 |

(Continued)

OTHER PUBLICATIONS

German Search Report for Application No. 10 2019 105 108.8 dated Nov. 5, 2019, 8 pages.

(Continued)

*Primary Examiner* — Tien Q Dinh
*Assistant Examiner* — Nevena Aleksic
(74) *Attorney, Agent, or Firm* — Nixon & Vanderhye P.C.

(57) ABSTRACT

A wing leading-edge device is disclosed having a slat body having a front side with a forward skin and a back side with a rearward skin, and at least a drive arrangement having at least one lug and a slat track, wherein the back side extends between an upper spanwise edge of the forward skin and a lower spanwise edge of the forward skin. The back side is defined by a continuously curved profile contour for receiving a fixed leading edge, and the at least one lug is at least partially arranged between the back side and the front side. The slat track is coupled with the first lug. The connection points to the slat body are shifted far forward to improve the load introduction and reduce moments acting on the drive mechanism.

14 Claims, 3 Drawing Sheets

(51) Int. Cl.
    *B64C 3/18* (2006.01)
    *B64C 9/14* (2006.01)

(56) References Cited

U.S. PATENT DOCUMENTS

| | | | | |
|---|---|---|---|---|
| 2011/0036944 A1* | 2/2011 | Mann | ................ | B64C 9/22 |
| | | | | 244/99.3 |
| 2013/0214096 A1* | 8/2013 | Wilson | ................ | B64C 3/50 |
| | | | | 277/642 |
| 2014/0131512 A1* | 5/2014 | Gyuricsko | ............ | F16C 29/045 |
| | | | | 439/32 |
| 2014/0339358 A1 | 11/2014 | Swartley et al. | | |
| 2015/0298795 A1* | 10/2015 | Parker | ................ | B64C 9/02 |
| | | | | 244/214 |
| 2019/0112029 A1* | 4/2019 | Turner | ................ | B64C 3/50 |

FOREIGN PATENT DOCUMENTS

| | | |
|---|---|---|
| EP | 3 395 679 A1 | 10/2018 |
| GB | 2 458 683 | 9/2009 |
| WO | 2018/197649 | 11/2018 |

OTHER PUBLICATIONS

International Search Report for PCT/EP2020/055279 dated May 25, 2020, 5 pages.
Written Opinion of the ISA for PCT/EP2020/055279 dated May 25, 2020, 10 pages.

\* cited by examiner

WING LEADING-EDGE DEVICE AND A WING HAVING SUCH A WING LEADING-EDGE DEVICE

CROSS REFERENCE TO RELATED APPLICATIONS

The present application is a National Phase of International Application Number PCT/EP2020/055279 filed Feb. 28, 2020, which designated the U.S. and claims priority benefits from German Application Number DE 10 2019 105 108.8 filed Feb. 28, 2019, the entire contents of each of which are hereby incorporated by reference.

TECHNICAL FIELD

The invention relates to a wing leading-edge device, a wing having a fixed leading edge and a wing leading-edge device, as well as an aircraft.

BACKGROUND OF THE INVENTION

For increasing the lift coefficient of a wing of a commercial aircraft, high lift systems are known. These may include trailing edge flaps, and leading-edge devices. During takeoff and landing, they are usually activated, i.e. moved from a retracted into an extended position. For this purpose, drive mechanisms are used, which are coupled with respective flow bodies and drives through appropriate joints, gears and other devices.

Leading-edge slats usually comprise a front skin, a back skin and mechanical interfaces for coupling with a slat track. The leading-edge slat is designed to be arranged directly in front of a fixed leading-edge of a wing, wherein a drive mechanism protrudes out of the fixed leading edge towards the slat. Common embodiments comprise a slat track that is guided by track support rollers arranged in the fixed leading edge, wherein the slat track protrudes through a front spar of the fixed leading edge. For many load cases, a resultant air load vector is pointing more forward and therefore has an offset to interface points on the leading-edge slat. This offset result in an additional moment introduced into the fixed leading-edge structure.

EP3395679A1 shows a slat arranged on a wing, and a connection assembly for movably connecting the slat to the main wing, such that the slat is movable in a predefined motion between a retracted position and at least one extended position. A front spar of a fixed leading edge of the wing, wherein an elongate guide of the connection assembly is completely arranged in an interior space between the front spar and the slat.

SUMMARY OF THE INVENTION

It is an object of the invention to propose an alternate wing leading-edge device, which improves its coupling to a drive mechanism and that reduces penetrations through structures of a fixed leading edge.

This object is met by the wing leading-edge device having the features of independent claim 1. Advantageous embodiments and further improvements may be gathered from the subclaims and the following description.

A wing leading-edge device is proposed, comprising a slat body having a front side with a forward skin and a back side with a rearward skin, and at least a drive arrangement having at least one lug and a slat track, wherein the back side extends between an upper spanwise edge of the forward skin and a lower spanwise edge of the forward skin, wherein the back side is defined by a continuously curved profile contour for receiving a fixed leading edge of a wing, wherein the at least one lug is at least partially arranged between the back side and the front side, and wherein the slat track is coupled with the at least one lug.

The slat body may comprise an elongate shape that extends along a spanwise direction and comprises a certain profile contour. The profile contour is mainly determined by the desired aerodynamic characteristics. It is preferred that the slat is sufficiently stiff to serve for the intended purpose. It may be preferred that the slat body comprises stiffening elements, such as ribs and/or stringers to be arranged on an inner side of the forward skin. Further, some sections of the slat body may comprise load introduction arrangements, which are mechanically adapted for a reliable load transfer between the slat body and the drive mechanism.

The forward skin is designed according to the aerodynamic requirements. It comprises an upper edge and a lower edge, which both run in a spanwise direction. The forward skin substantially extends between these edges in a concave shape. At a rearward position, i.e. behind the inner side of the forward skin, the back side of the slat body is created. The back side is characterized by an at least theoretical, surface-like delimitation that is adapted to the outer shape of a fixed leading edge, to which the wing leading-edge device will be attached. The back side of the slat body is intended to fit onto the fixed leading edge in a very close manner in a retracted state. In some embodiments, the whole back side comprises a back skin, which follows this theoretical, surface-like shape. In some embodiments, such a back skin may comprise cutouts or recesses. In still further embodiments, the back skin may comprise a cutback along its whole spanwise extension.

Coupling the slat track with the at least one lug does not necessarily mean a direct connection. It may also be possible to use an additional link, a plate or any other component that is arranged between the slat track and the at least one lug to couple the at least one lug and the slat track. In the following, the term "coupling" is thus to be understood as directly or indirectly connected in general.

A gist of the invention lies in providing the at least one lug at least partially between the back side and the front side, i.e. between the back side and the front skin. Thus, the required joints and coupling devices are substantially completely inside the slat body. This allows to shift resulting reaction forces to an air load vector into a forward direction to form a clearly reduced offset mentioned above. As a consequence, the additional moment acting into the fixed leading edge is reduced, too. The slat track does not necessarily need to be supported in a region behind a front spar of the fixed leading edge. Penetrations through a front spar are thus eliminated, which in turn reduces the impact on the design of the fixed leading edge. Overall, the design of the fixed leading edge is thereby greatly improved.

It is further to be understood that the wing leading-edge device according to the invention preferably comprises two drive arrangements mentioned above for a single slat body to provide a desired motion of the complete slat body in a chordwise direction.

In an advantageous embodiment, the forward skin and the back side enclose a hollow space, wherein the at least one lug is at least partially arranged inside the hollow space. Thus, the at least one lug and the associated connection to the drive mechanism is provided in a further forward position, which leads to a further improved coupling to the leading-edge device and a further improved mechanical design regarding the expected air load vector impact.

In another advantageous embodiment, the hollow space is enclosed by the forward skin and the rearward skin, wherein the at least one lug is completely arranged inside the hollow space. Consequently, the resulting position of the connections to the drive mechanism is as forward as possible.

Advantageously, the at least one drive arrangement comprises a first lug, a second lug and a support link, wherein the support link is swivably coupled with the second lug and the slat track. The support link thus stabilizes a rotational position of the slat body. The arrangement of a first lug and a second lug, which are at a distance to each other, allows the transfer of a substantial moment from the slat body into the slat track. For minimizing the required space for such an arrangement, the support link may be as small as possible.

The slat track may be swivably coupled with the first lug. The first lug may be arranged forward of the second lug and the slat track may consequently be arranged as forward as possible.

In a very advantageous embodiment, the at least one lug is arranged on a stiffening rib of the slat body. Thus, two functions are combined, i.e. a stiffening function through the rib itself and a load introduction function through the at least one lug integrated into the rib.

Still further, the stiffening rib may partially extend through the rearward skin. In this embodiment, a balancing between compactness, available space, maintenance and bearing design is made. While it would be possible to arrange the rib and the first lug completely inside the space defined by the forward skin and the backside, a slight protrusion of the rib through the rearward skin may be tolerated.

Advantageously, the slat body may comprise at least one cut-out through the rearward skin for feeding the slat track into the slat body. The cutout may be as small as possible to allow feeding the slat track into the slat body, but for allowing a sufficient clearance under consideration of vibrations, temperature deviations, loaded and unloaded states etc. Also, the cutout may be designed for meeting installation, assembly and disassembly requirements.

When a cutout is used, it may be beneficial if the cutout is arranged at a distance to at least one of the upper edge and the lower edge. The cutout may then only extend on an inner section of the rearward skin between the edges and may, if required, reach one of the edges at a maximum.

In a further advantageous embodiment, the slat body may comprise a cutback of the rearward skin that extends substantially along the whole extension of the slat body in a spanwise direction, wherein the at least one lug is arranged in the cutback. Such a design may lead to a reduced weight as well as a simplified installation, assembly and disassembly.

It is preferred, if the slat track comprises a curved track section and a forward leg, wherein the forward leg is fixedly arranged at an angle to a tangential line of the curved track section on a connection point between the track section and the forward leg, and wherein the support link is swivably connected to the forward leg.

The invention further relates to a wing having a fixed leading edge and a wing leading-edge device according to the above description, wherein the at least one drive arrangement is coupled with the fixed leading edge, such that the slat track is movably supported on the fixed leading edge in a way that the slat is movable between a retracted position, in which the rearward skin is directly forward of a front skin of the fixed leading edge, and extended positions further forward the fixed leading edge.

Advantageously, the fixed leading edge comprises a front spar, wherein the slat track is supported by a plurality of track support rollers, and wherein the track support rollers are arranged between the front spar and the front skin of the fixed leading edge. The rollers may be rotatably arranged on stiffening ribs placed in the fixed leading edge. Bearings for the rollers may thus be arranged on a part of the stiffening ribs that is arranged between the front skin of the fixed leading edge.

Still further, the drive arrangement may be designed such that a vector of an air load on the slat body extends into a region between the first lug and the second lug at least in a retracted position of the slat. The vector of the air load may also extend into the region between the first lug and the second lug in an extended position. The extended position may be a fully extended position or less.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims.

Furthermore, identical or similar objects are identified by the same reference symbols in the figures.

DETAILED DESCRIPTION OF EXEMPLARY EMBODIMENTS

Figure 1:
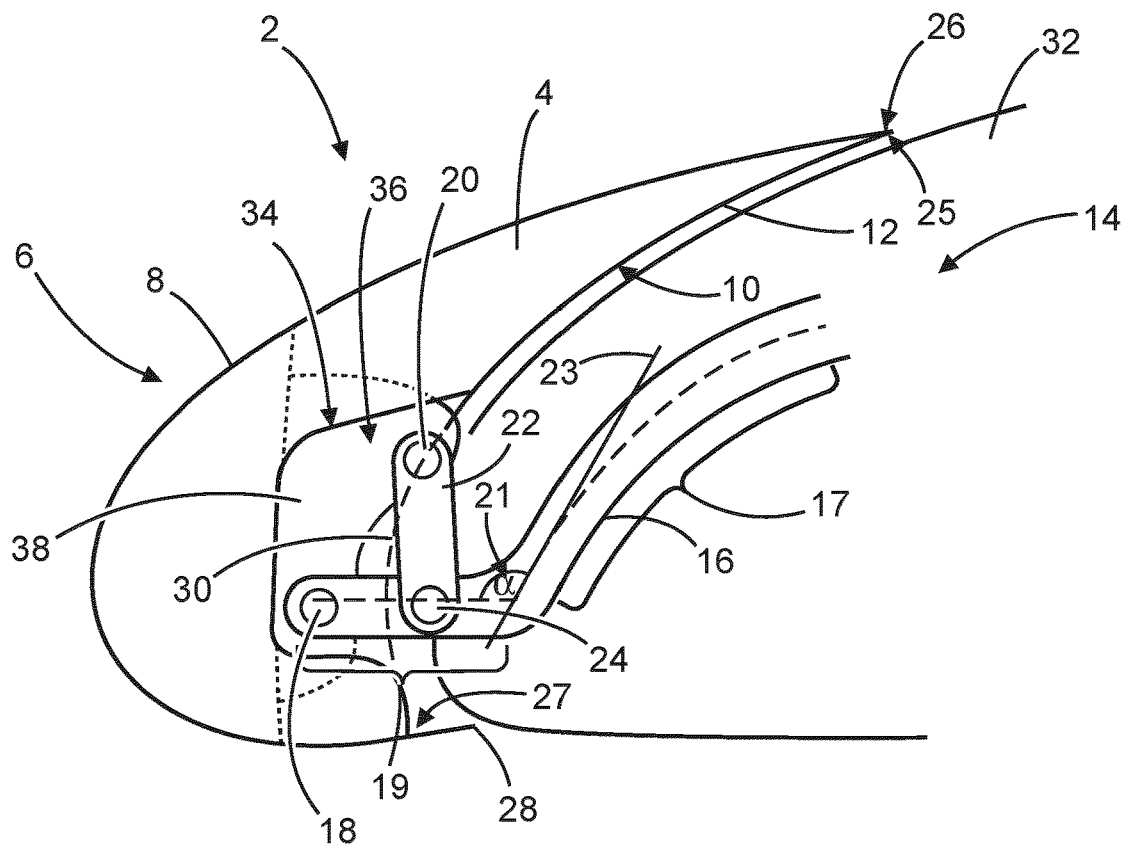
FIG. 1 shows a first exemplary embodiment of the leading-edge device 2 in a lateral view.

FIG. 1 shows a first embodiment of a wing leading-edge device 2, which comprises a slat body 4 having a front side 6 with a forward skin 8 and a back side 10 with a rearward skin 12. A drive arrangement 14 is coupled with the slat body 4 and comprises a slat track 16 and a first lug 18. In addition, a second lug 20 is arranged on the slat body 4 and is coupled with a support link 22, which in turn is swivably coupled with the slat track 16 on a connecting joint 24. The forward skin 8 comprises an upper spanwise edge 26 and a lower spanwise edge 28. The forward skin 8 extends between these two edges 26 and 28 with a convex shape bulging out in a forward direction. The back side 10, which extends between the edges 26 and 28 and a distance from the forward skin 8, constitutes a delimitation indicated with the rearward skin 12 and a dashed line 30 that extends up to the lower edge 28. The rearward skin 12 comprises an upper rearward skin edge 25 and a lower rearward skin edge 27. Both rearward skin edges 25 and 27 are attached to the front skin 8. Due to the design of the back side 10 it allows to move the slat body 4 closely to a fixed leading edge 32 of the wing, to which the device 2 is attached.

In this exemplary embodiment, the forward skin 12 comprises a cut-out 34, which is at a distance both to the upper edge 26 and the lower edge 28. The cut-out 34 allows to lead the slat track 16 into a hollow space 36 of the slat body 4.

Still further, in this exemplary embodiment, the first lug 18 and the second lug 20 are arranged on a rib 38 inside the slat body 4. The rib 38 may be realized in the form of a stiffening rib, which is provided for supporting the outer geometry of the slat body 4 at least under a design air load. By arranging the cut-out 34 into the rearward skin 12, a back side of the rib 38 is easily accessible for coupling with the slat track 16 and the support link 22. Resultantly, in comparison with common leading-edge devices, the slat track 16, the support link 22 as well as the lugs 18 and 20 are placed far forward, such that a drive mechanism 14 is almost at a forwardmost position. This improves the transfer of air loads into the drive mechanism 14 and reduces a moment to be compensated at an outer end of the slat track 16. Still further, rollers for supporting the slat track 16 (see FIG. 4) can be clearly moved into a forward direction to be placed in front of a front spar of the fixed leading edge 32 (see FIG. 4). In this exemplary embodiment, the slat track 16 comprises a curved track section 17 and a forward leg 19, between which a connection point 21 is positioned. The forward leg 19 is arranged at an angle α to a tangential line 21 of the curved track section 17 on the connection point 21. The support link 22 is swivably connected to the forward leg 19.

Figure 2:
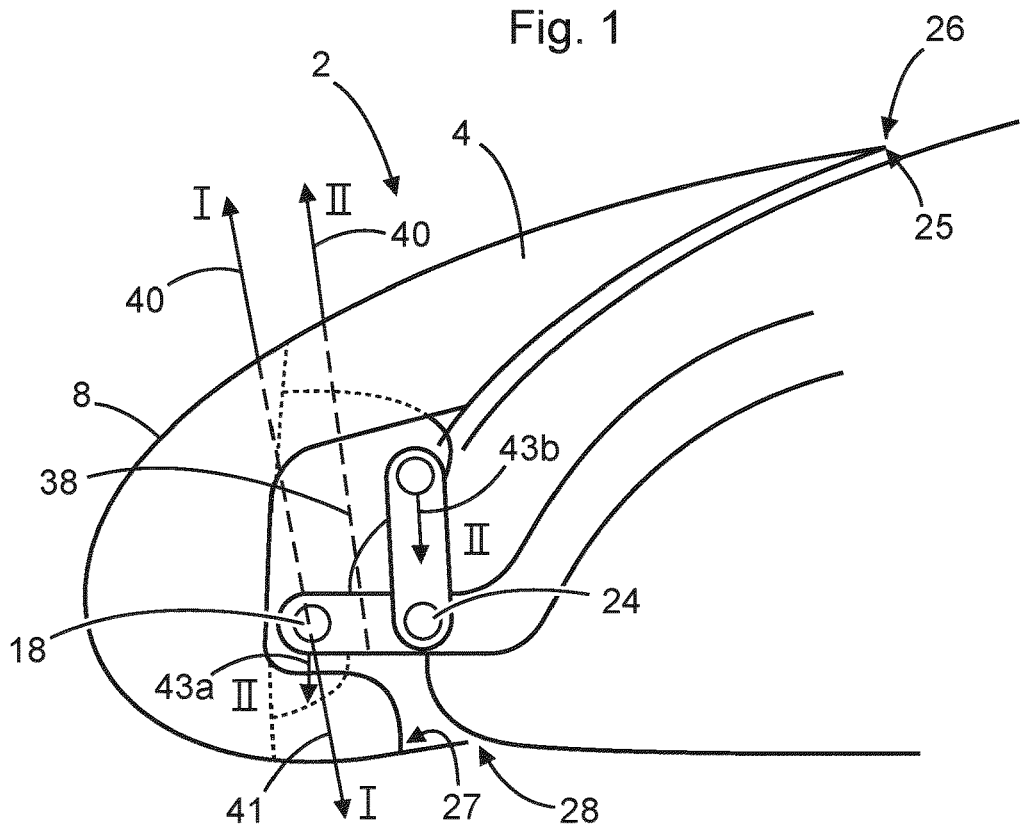
FIG. 2 shows typical air load vectors and the resulting structural loads in a lateral view.

FIG. 2 shows resulting forces inside the leading-edge device 2 depending on the air load that acts onto the slat body 4. Two slightly different examples are shown, which are numbered with I and II. Load case I stands for an air load vector 40, which has a direction that extends directly through the first lug 18. In the other load case II, the air load vector 40 has a slight offset in comparison to load case I. Here, the vector extends through a position between the first lug 18 and the connecting joint 24. In the first case I, substantially only the first lug 18 needs to compensate the air load by a respective reaction force 41 and may thus be substantially the inverse force of the air load. However, in the second case II, both the first lug 18 and the connecting joint 24 need to compensate the air load 40 through individual reaction forces 43a and 43b. However, in common leading-edge devices, the air load vector 40 is offset in a forward direction, such that the reaction forces 43a and 43b are much greater.

Figure 3:
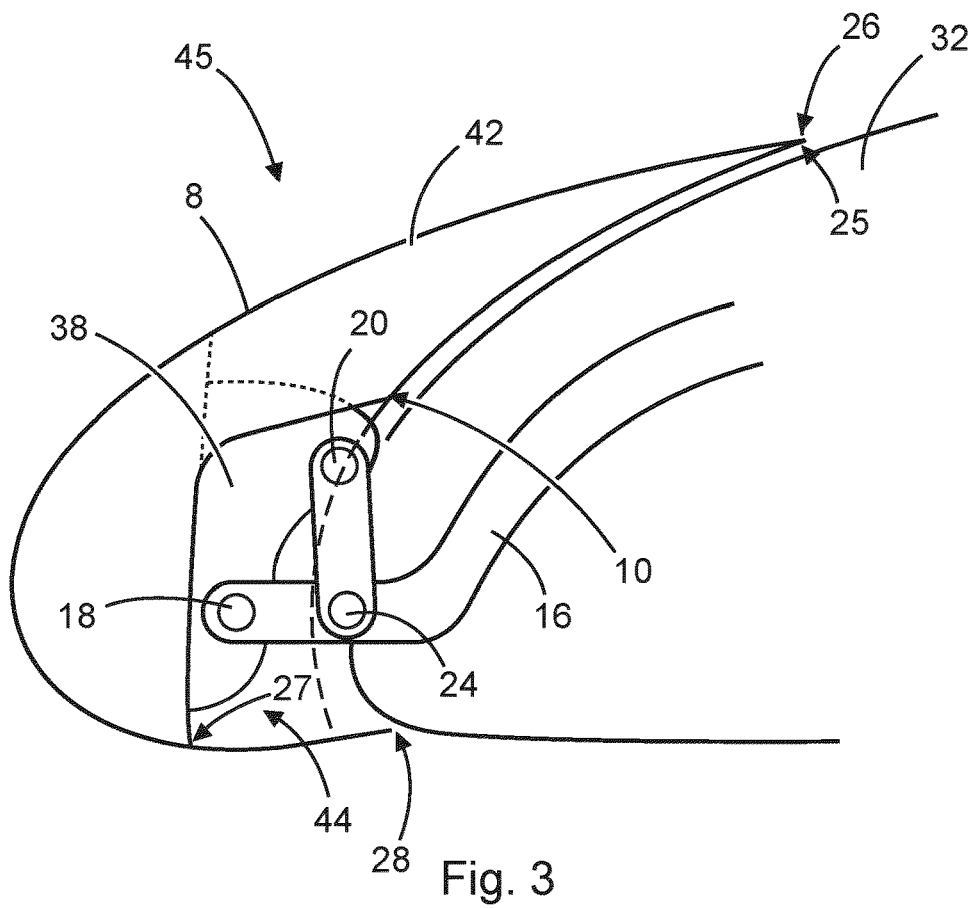
FIG. 3 shows another embodiment having a cutback along the spanwise extension in a lateral view in a lateral view.

In FIG. 3 a slightly modified slat body 42 in a wing leading-edge device 45 is shown, which comprises a complete cutback 44 that extends substantially along the whole spanwise extension of the slat body 42. Here, ribs 38 may stick out into the cutback 44 and the first lug 18 and the second lug 20 are easily accessible between the forward skin 8 and the backside 10. This exemplary embodiment has an advantageously low weight and still allows the slat body 42 to be positioned close to the fixed leading edge 32.

Figure 4:
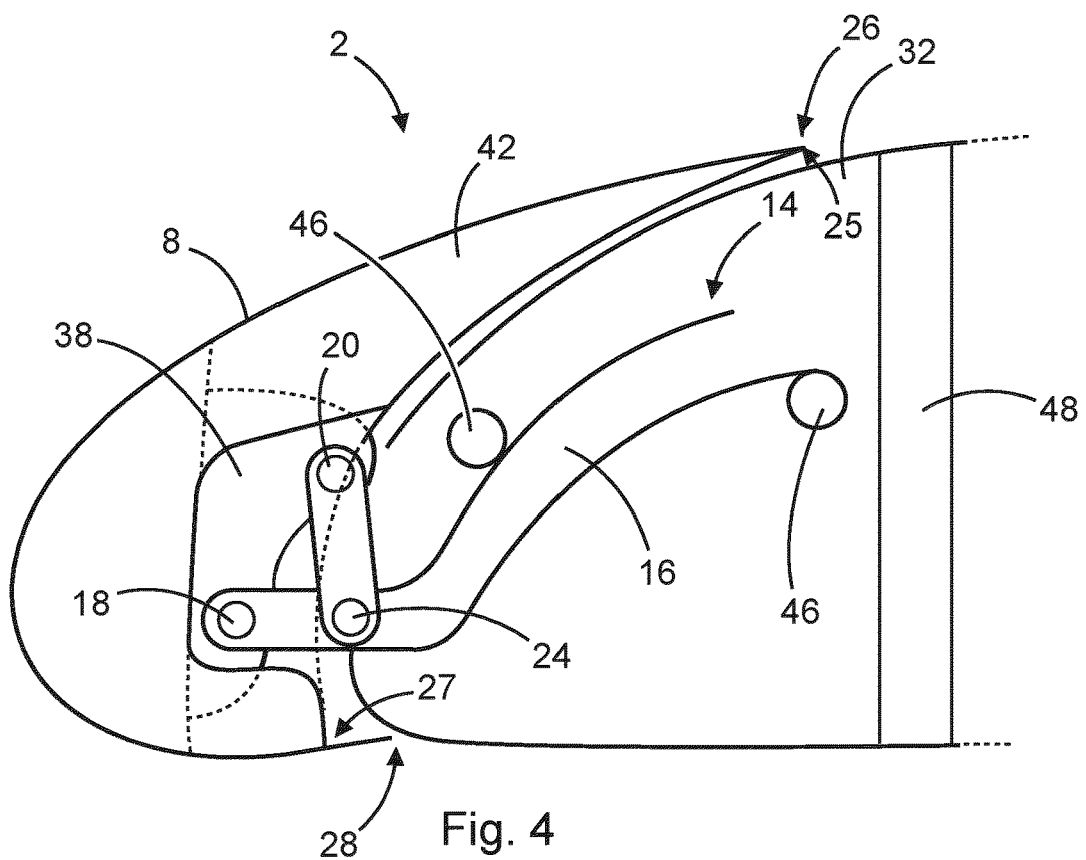
FIG. 4 shows roller guides for supporting a slat track in a lateral view.

FIG. 4 illustrates possible rollers or roller guides 46 that support the slat track 16. The roller guides 46 are rotatably supported and are distributed in the fixed leading edge 32 to provide a single motion path for the slat track 16. Thus, the slat track 16 may only move along the single motion path that depends the shape of the slat track 16 and the positions of the roller guides 46. All loads that are introduced into the drive mechanism 14 can be transferred into the fixed leading edge 32 through the roller guides 46.

Using common design philosophies, the fixed leading edge 32 comprises a stiffening structure, which may include several spars. A front spar 48 is arranged at a forward position in a distance to the actual leading edge. By shifting the drive mechanism 14 and thus the roller guides 46 far forward, compared to common leading-edge devices, the front spar 48 does not need to be penetrated by the slat track 16. Thus, the structural stability of the fixed leading edge 32 is not influenced by any recess or cut-out required for the movability of the slat track 16.

Figure 5:
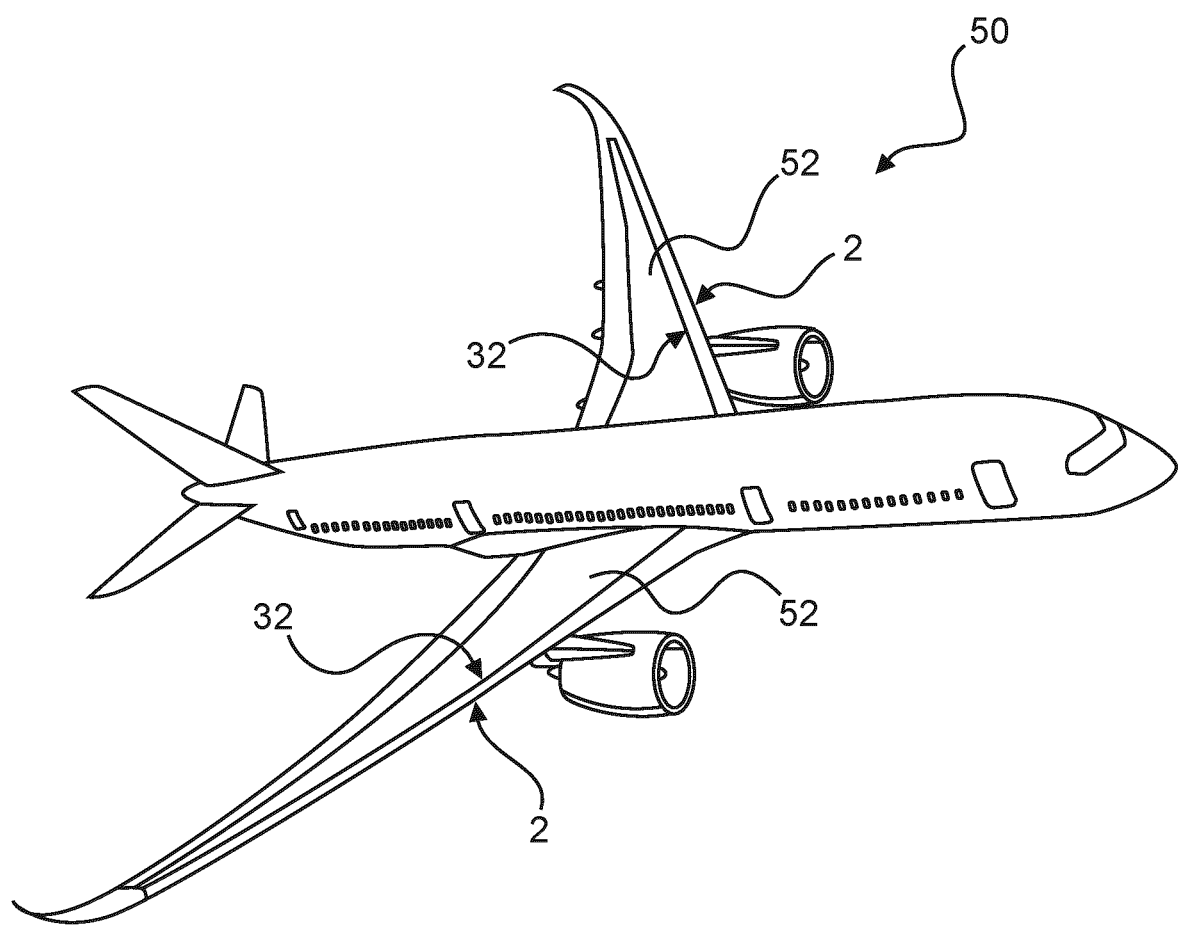
FIG. 5 shows an aircraft in a three-dimensional view.

Lastly, FIG. 5 shows an aircraft 50 having wings 52, to which wing leading-edge devices 2 are arranged.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

REFERENCE NUMERALS 2 wing leading-edge device
4 slat body
6 front side
8 forward skin
10 back side
12 rearward skin
14 drive arrangement
16 slat track
17 curved track section
18 first lug
19 forward leg
20 second lug
21 connection point 21
22 support link
23 tangential line
24 connecting joint
26 upper spanwise edge
28 lower spanwise edge
30 dashed line
32 fixed leading edge
34 cut-out
36 hollow space
38 stiffening rib
40 air load vector
41 reaction force
42 slat body
43a, 43b reaction force
44 cutback
45 wing leading-edge device
46 roller guide
50 front spar
52 aircraft
52 wing

The invention claimed is:

1. A wing leading-edge device, comprising a slat body having a front side with a forward skin and a back side with a rearward skin, and at least a drive arrangement having at least one lug and a slat track,
   wherein the at least one drive arrangement comprises a support link having a first end and a second,
   wherein the slat track comprises a curved track section and a forward leg,
   wherein the back side extends between an upper spanwise edge of the forward skin and a lower spanwise edge of the forward skin,
   wherein the back side is defined by a continuously curved profile contour for receiving a fixed leading edge of a wing, wherein the at least one lug is at least partially arranged between the back side and the front side and is arranged on a stiffening rib of the slat body, wherein the slat track is coupled with the at least one lug, and wherein the support link is swivably connected to the forward leg on a connecting joint at the first end and to the stiffening rib at the second end.

2. The wing leading-edge device according to claim 1, wherein the forward skin and the back side enclose a hollow space, wherein the at least one lug is at least partially arranged inside the hollow space.

3. The wing leading-edge device according to claim 2, wherein the hollow space is enclosed by the forward skin and the rearward skin, and wherein the at least one lug is completely arranged inside the hollow space.

4. The wing leading-edge device according to claim 1, wherein the at least one drive arrangement comprises a first lug.

5. The wing leading-edge device according to claim 4, wherein the slat track is swivably coupled with the first lug.

6. The wing leading-edge device according to claim 1, wherein the stiffening rib partially extends through the rearward skin.

7. The wing leading-edge device according to claim 1, wherein the slat body comprises at least one cut-out through the rearward skin for feeding the slat track into the slat body.

8. The wing leading-edge device according to claim 7, wherein the rearward skin comprises an upper rearward skin edge and a lower rearward skin edge, which are attached to the forward skin, and wherein the cut-out is arranged at a distance to at least one of the upper rearward skin edge and the lower rearward skin edge.

9. The wing leading-edge device according to claim 1, wherein the slat body comprises a cutback of the rearward skin that extends substantially along the whole extension of the slat body in a spanwise direction, wherein the at least one lug is arranged in the cutback.

10. The wing leading-edge device according to claim 4, wherein the slat track comprises a curved track section, wherein the forward leg is fixedly arranged at an angle (a) to a tangential line of the curved track section on a connection point between the curved track section and the forward leg, and.

11. A wing having a fixed leading edge and a wing leading-edge device according to claim 1, wherein the at least one drive arrangement is coupled with the fixed leading edge, such that the slat track is movably supported on the fixed leading edge in a way that the slat body is movable between a retracted position, in which the rearward skin is directly forward of a front skin of the fixed leading edge, and extended positions further forward the fixed leading edge.

12. The wing according to claim 11, wherein the fixed leading edge comprises a front spar, wherein the slat track is supported by a plurality of roller guides, and wherein the roller guides are arranged between the front spar and the front skin of the fixed leading edge.

13. The wing according to claim 11, wherein the drive arrangement is designed such that an air load vector on the slat body extends into a region between the first lug and the second lug at least in a retracted position of the slat body.

14. An aircraft, having at least one wing according to claim 11.

* * * * *